United States Patent [19]

Matsumura et al.

[11] Patent Number: 5,753,737
[45] Date of Patent: May 19, 1998

[54] COATING COMPOSITION

[75] Inventors: Shoichi Matsumura, Kobe; Toshiro Nanbu, Kakogawa; Hisao Furukawa, Kobe; Jo Kawamura, Akashi; Hirotoshi Kawaguchi, Kobe, all of Japan

[73] Assignee: Kanegafuchi Kagaku Kogyo Kabushiki Kaisha, Osaka, Japan

[21] Appl. No.: 761,519

[22] Filed: Dec. 9, 1996

Related U.S. Application Data

[63] Continuation of Ser. No. 728,306, Jul. 8, 1991, abandoned, which is a continuation of Ser. No. 333,765, Apr. 5, 1989, abandoned, which is a continuation of Ser. No. 82,172, Aug. 6, 1987, abandoned.

[30] Foreign Application Priority Data

Jun. 3, 1986 [JP] Japan ............................... 61-137898

[51] Int. Cl.$^6$ ............................................ C08K 5/10
[52] U.S. Cl. ................... 524/315; 524/506; 524/858; 524/865; 525/102
[58] Field of Search ................... 524/315, 566, 524/865, 858; 525/102

[56] References Cited

U.S. PATENT DOCUMENTS

| | | |
|---|---|---|
| 3,837,876 | 9/1974 | Mayuzumi et al. |
| 4,177,301 | 12/1979 | Smith, Jr. |
| 4,389,432 | 6/1983 | Inoue et al. ............... 525/102 |
| 4,399,261 | 8/1983 | Kato et al. ............... 525/342 |
| 4,463,129 | 7/1984 | Shinada et al. ............... 525/102 |
| 4,465,712 | 8/1984 | McVic ............... 524/869 |
| 4,578,417 | 3/1986 | Furukawa ............... 524/858 |
| 4,618,656 | 10/1986 | Kawakubo ............... 525/404 |
| 4,727,168 | 2/1988 | Yashino et al. ............... 556/408 |

FOREIGN PATENT DOCUMENTS

| | | |
|---|---|---|
| 80-41702 | 10/1980 | Japan. |
| 0050249 | 4/1982 | Japan. |

OTHER PUBLICATIONS

Abstract JP-A-57 105 446, Jun. 30, 1982.

*Primary Examiner*—Ralph H. Dean
*Attorney, Agent, or Firm*—Armstrong, Westerman, Hattori, McLeland & Naughton

[57] ABSTRACT

A coating composition containing (A) a silyl group-containing vinyl polymer which has on the polymer chain ends or side chain thereof at least one silicon atom, to which a hydrolyzable group is linked, per polymer molecule, (B) a reaction product of an aminosilane compound with an epoxy compound (C) a hydrolyzable ester compound and (D) an inorganic pigment.

The coating composition of the present invention has excellent film properties such as appearance, moisture resistance and grindability and is suitable for use as an undercoating and a primer coating.

8 Claims, 1 Drawing Sheet

F I G. 1
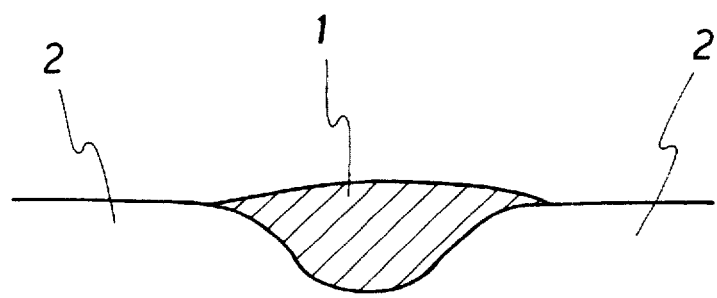

COATING COMPOSITION

This application is a continuation of application Ser. No. 07/728,306, filed Jul. 8, 1991, which is a continuation of Ser. No. 07/333,765, filed Apr. 5, 1989, which is a continuation of Ser. No. 07/082,172, filed Aug. 6, 1987 all abandoned.

BACKGROUND OF THE INVENTION

The present invention relates to a coating composition suitable for use of a undercoat, and more particularly to a coating composition containing a hydrolyzable silyl group-containing vinyl copolymer which is as excellent as a lacquer in workability, and is suitable for use as a primer surfacer.

Hitherto, as a primer surfacer used as an automotive refinishing paint, there have been widely known two kinds of primer surfacers, i.e. a one component composition such as lacquers and two component composition such as urethane resin paints comprising an isocyanate compound as a hardener and a polyol as a main component.

On the other hand, a lacquer and a urethane resin paint have been used as a top coat which is applied on the primer surfacer for finishing, and a two component urethane resin paint has become more popular from its excellent properties such as appearance and film properties. In case that the urethane resin paint is used as the top coat, it is preferable to use the two component urethane resin paint as the primer surfacer from the point of film properties. However, since the urethane resin primer surfacer has disadvantages, the lacquer primer surfacer is widely used and a combination of the lacquer primer surfacer and the urethane resin top coat is widely adopted. Such a case, there are problems in film properties due to the use of the lacquer primer surfacer, for instance, blisters are generated on the film surface because of bad moisture resistance, and such problems have not been solved.

The urethane primer surfacer has the defect in a sanding workability. That is, the lacquer primer surfacer can be sanded at room temperature within from about 30 minutes to about 1 hour after applying, onto which a top coat can be coated. On the other hand, in case of the urethane primer surfacer, it takes 4 to 5 hours at room temperature to sand the primer surfacer and to coat onto the surface of the surfacer with a top coat. That is, when the urethane primer surfacer is used as an automotive refinishing paint, since the sanding workability is very important, the above problem is serious.

In a course of earnest study of a silyl group-containing vinyl copolymer having a hydrolyzable group, it has been found that a silyl group-containing vinyl copolymer is remarkably excellent in sanding workability.

That is, since the urethane resin paint contains an isocyanate compound which has fear for toxicity, the present inventors have been studied with respect to paints having no isocyanate compounds and having excellent film properties instead of urethane resin paints (for instance, Japanese Unexamined Patent Publication No. 36395/1979). As a result, it has been found that a silyl group-containing vinyl copolymer is quick in dryability of the film surface and is excellent in sanding workability at ordinary temperature. In such a case, curing agents may be used or not according to conditions of coating, and the excellency of the sanding workability do not depend on whether the curing agent is used or not.

In Japanese Examined Patent Publication No. 15104/1986, there is reported an anti-corrosive coating composition comprising (a) an acrylic copolymer consisting of (1) a monomer represented by the formula:

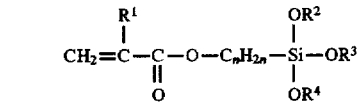

wherein $R^1$ is hydrogen or methyl group, $R^2$, $R^3$ and $R^4$ are same or different and each is an alkyl group having 1 to 4 carbon atoms, and n is an integer of 1 to 12, (2) styrene, and (3) (meth)acrylates; and (b) an acrylic copolymer containing styrene. It has been found that the acrylic copolymer (b) even with the use of a curing agent cannot give crosslinked cured films since it has no hydrolyzable silyl group, and a composition comprising the acrylic copolymer (a) containing hydrolyzable silyl group and a curing agent is excellent in film properties.

An object of the present invention is to provide a primer surfacer which is as excellent as the lacquer in sanding workability and has excellent film properties.

The above and other objects of the present invention will become apparent from the description hereafter.

SUMMARY OF THE INVENTION

In accordance with the present invention, there is provided a coating composition comprising (A) a silyl group-containing vinyl polymer whose main chain consists essentially of a vinyl polymer and which has on the polymer chain end or the side chain thereof at least one silicon atom to which a hydrolyzable group is linked, per one polymer molecule, (B) an amino group-containing silicon compound, (C) a hydrolyzable ester compound and (D) an inorganic pigment.

The coating composition is excellent in dryability at ordinary temperature and sanding workability, and is suitable for use as a primer surfacer.

BRIEF DESCRIPTION OF THE DRAWING

FIG. 1 is a cross sectional view of a film composed of a primer surfacer applied on a film surface of a melamine alkyd paint.

DETAILED DESCRIPTION

The amino group-containing silicon compound (B) improves adhesion of the composition of the invention to various base materials. The hydrolyzable ester compound (C) is a dehydrating agent for preventing the increase of the viscosity of the coating composition caused by reacting the silyl group-containing vinyl polymer (A) with water to hydrolyze.

The silyl group-containing vinyl polymers (A) can be prepared by copolymerization of a polymerizable organic silane (polymerizable silyl group-containing monomer) with a vinyl monomer. Examples of the polymerizable organic silanes are, for instance, a vinyl monomer having a hydrolyzable silyl group such as γ-methacryloyloxypropyltrimethoxysilane, vinyl trimethoxysilane or vinyl triethoxysilane. Examples of the vinyl monomer to be copolymerized with the polymerizable organic silane are, for instance, styrene, acrylic acid or its ester such as methyl acrylate, ethyl acrylate, butyl acrylate, 2-ethylhexyl acrylate, tridecyl acrylate or stearyl acrylate, methacrylic acid or its ester such methyl methacrylate, ethyl methacrylate, butyl methacrylate, 2-ethylhexyl methacrylate, tridecyl methacrylate or stearyl methacrylate, acrylamide, acrylonitrile, methacrylamide, N-methylol acrylamide, N-methylol methacrylamide, maleic anhydride, glycidy methacrylate, vinyl monomer containing hydroxyl group such as 2-hydroxyethyl acrylate or 2-hydroxyethyl methacrylate, and the like. Also, a polyester resin having a polymerizable unsaturated group can be used.

The copolymer of the polymerizable silyl group-containing monomer and the vinyl monomer can be prepared in usual solution polymerization manners. A mixture of the polymerizable silyl group-containing monomer, the vinyl monomer and a radical polymerization initiator and, if necessary, for obtaining the silyl group-containing vinyl polymer (A) having a molecular weight of 3,000 to 50,000, a chain transfer agent such as n-dodecylmercaptane, t-dodecylmercaptane or γ-mercapto propyltrimethoxysilane is reacted at 50° to 150° C. It is preferable to use non-reactive solvents, e.g. hydrocarbones such as toluene, xylene, n-hexane and cyclohexane, acetic acid esters such as methyl acetate and butyl acetate, alcohols such as methanol, ethanol, isopropanol and n-butanol, ethers such as methyl cellosolve and ethyl cellosolve.

Examples of the amino group-containing silicon compounds (B) are, for instance, aminosilane compounds such as γ-aminopropyltrimethoxysilane, γ-aminopropyltriethoxysilane, N-(β-aminoethyl)-aminopropyltrimethoxysilane, N-(β-aminoethyl)-aminopropyltriethoxysilane; and reaction products of the above amino silane compound and an epoxy compound. Examples of the epoxy compounds are, for instance, silane compounds such as γ-glycidoxypropyltrimethoxysilane and β-(3,4-epoxycyclohexyl)ethyltrimethoxysilane, epoxy resins such as bisphenol A epoxy resins, epoxy urethane epoxy resins, novolac epoxy resins, and the like.

Examples of the hydrolyzable ester compounds are, for instance, a hydrolyzable compound, i.e. an alkyl orthoformate such as methyl orthoformate or ethyl orthoformate, an alkyl orthoacetate such as methyl orthoacetate or ethyl orthoacetate; a hydrolyable organic silicone compound such as methyltrimethoxysilane, ethyltriethoxysilane, tetraethyl orthosilicate, γ-methacryloyloxypropyltrimethoxysilane, vinyltrimethoxysilane or vinyltris(2-methoxyethoxy)silane.

The inorganic pigments (D) are not particularly limited, and there can be used various silicas, calcium carbonate, aluminum oxide, zinc oxide, talc, titanium oxide, carbon black, and the like.

The amounts of the components (A), (B), (C) and (D) are not particularly limited. It is preferable that the amount of the component (B) is 0.1 to 300 parts, the amount of the component (C) is 0.1 to 100 parts and the amount of the component (D) is 5 to 1,000 parts, the part being parts by weight per 100 parts by weight of the component (A). Also, it is more preferable that the amount of the component (B) is 0.5 to 50 parts, the amount of the component (C) is 1 to 20 parts, and the amount of the component (D) is 30 to 500 parts, the parts being part by weight per 100 parts by weight of the component (A).

The coating composition of the present invention may include a curing agent or not. When using the curing agent, there are used organo tin compounds, acidic phospholic acid esters, reaction products of acidic phosphoric acid esters and amines, saturated or unsaturated polyhydric carboxylic acids and their anhydrides, organic titatinum compound, organic aluminum compound, and the like. Generally, it is preferable that the amount of the curing agent is not more than 20 parts by weight per 100 parts by weight of the compound (A).

The composition of the invention may further contain usual additives such as fillers, ultraviolet absorbents, antioxidants, flatting agents and levelling agents in known effective concentrations.

The coating composition of the present invention is useful for various industrial uses such as automotive refinishing paints and undercoats.

The present invenion is more specifically described and explained by means of the following Examples in which all parts and % are by weight unless otherwise noted. It is to be understood that the present invention is not limited to the Examples, and various changes and modifications may be made in the invention without departing from the spirit and scope thereof.

The following Reference Examples are presented to illustrate the preparation of the silyl group-containing vinyl polymer used as a component (A) in the present invention.

REFERENCE EXAMPLE 1

To 100 g of xylene heated at 100° C. was added dropwise a solution of 10 g of γ-methacryloyloxypropyltrimethoxysilane, 70 g of methyl methacrylate, 5 g of butyl acrylate, 15 g of stearyl methacrylate, 2 g of acrylamide and 0.5 g of azobisisobutyronitrile, and the reaction was carried out for 10 hours to give a silyl group-containing vinyl copolymer (A-1) having a molecular weight of 20,000.

REFERENCE EXAMPLE 2

To 100 g of xylene heated at 100° C. was added dropwise a solution of 20 g of γ-methacryloyloxypropyltrimethoxysilane, 15 g of styrene, 50 g of methyl methacrylate, 5 g of butyl acrylate, 2 g of acrylamide and 0.5 g of azobisisobutyronitrile, and the reaction was carried out for 10 hours to give a silyl group-containing vinyl copolymer (A-2) having a molecular weight of 20,000.

REFERENCE EXAMPLE 3

A silyl group-containing vinyl copolymer (A) was prepared by employing a polyester resin having a polymerizable unsaturated group as a vinyl compound to be reacted with on organic silane compound. The polyester resin was prepared as follows.

A four neck flask equipped with a stirrer, an inlet for intoducing nitrogen gas, a thermometer and an reflux condenser was charged with 43 g of a fatty acid of coconut oil, 10 g of glycerol, 15 g of pentaerythritol, 30 g of phthalic anhydride and a proper amount of xylene, and the mixture was reacted at 180° C. for 1 hour and then at 230° C. for 2 hours. After 2 g of maleic anhydride was added to the reaction mixture, the reaction was further continued at 230° C. for 1 hour to give a polyester resin having an acid value of 6.5. The obtained polyester resin was diluted with xylene to the solid concentration of 60% to give a solution of a polyester resin having a viscosity of 1,000 cps.

To 100 g of xylene heated at 100° C. was added dropwise a solution of 15 g of the obtained solution of polyester resin, 10 g of γ-methacryloyloxypropyltrimethoxysilane, 5 g of styrene, 60 g of methyl methacrylate, 3 g of butyl acrylate, 10 g of n-butyl methacrylate, 1 g of azobisisobutyronitrile and 5 g of n-butanol, and the reaction was carried out for 10 hours to give a silyl group-containing vinyl copolymer (A-3) having a molecular weight of 12,000.

EXAMPLES 1 to 4

As an amino group-containing silicon compound (B), there was used a reaction product of a silane coupling agent A-1100 (γ-aminotriethoxysilane) and a silane coupling agent A-187 (γ-glycidoxypropyltrimethoxysilane), which were commercially available from Union Carbide Corp., in a molar ratio of 1:2.2.

As a hydrolyzalbe ester compound (C), there was used a mixture of methyl orthoacetate and γ-methacryloyloxypropyltrimethoxysilane in a weight ratio of 1:1.

As a inorganic pigment (D), there was used an inorganic pigment which was a mixture of talc, calcium carbonate and titanium oxide in a weight ratio of 10:70:20.

The components (A), (B), (C) and (D) were mixed with a paint shaker for 3 hours to give a desired resin composition for undercoating.

As a curring agent, dibutyl tin maleate was employed in an amount of 1 part based on 100 parts of the solid matter of the component (A).

The properties of the obtained film were observed. The results are shown in Table 1.

COMPARATIVE EXAMPLE 1

Film properties of a commercially available lacquer surfacer ("α-Surfacer") were observed. The results are shown in Table 1.

COMPARATIVE EXAMPLE 2

Film properties of a commercially available urethane surfacer ("Hi-Primersurfacer ZC") were observed. The results are shown in Table 1.

surfacers) obtained in Examples 1 to 4 and Comparative Examples 1 and 2 is spraied onto the surface of the melamine alkyd film as shown in FIG. 1 wherein 1 shows the primer surfacer and 2 shows the melamine alkyd baking paint film, dried at 60° C. for 60 minutes, and then sanded with the No. 400 water-proof abrasive paper. The commercially available urethane paint ("Super White") is coated on the primer surfacer, and cured at 60° C. for 60 minutes. After the obtained test peace is allowed to stand for 3 days at ordinary temperature, and then in a blister box (50° C., 98% RH) for 3 days. The surface of the test piece is observed with the naked eye.

o: There is no change.

X: Blisters are generated on the surface.

(Sanding workability)

It is tested that how many hours are required until it becomes possible to sand the composition (primer surfacer) obtained in Examples 1 to 4 and Comparative Examples 1 and 2 with a No. 400 water-proof abrasive paper, after applying the primer surfacer on a polished mild steel plate and being allowed to stand at room temperature (23° C.).

TABLE 1

| | Kind of vinyl polymer (A) | Amounts of the components (A),(B),(C) and (D) (parts) | | | | | Film Property | | |
|---|---|---|---|---|---|---|---|---|---|
| | | (A) | (B) | (C) | (D) | Curing agent | Appearance | Moisture resistance | Grindability |
| Ex. 1 | A-1 | 30 | 0.5 | 1.5 | 40 | — | Ⓐ | ○ | 1 hour |
| Ex. 2 | A-2 | 30 | 0.5 | 1.5 | 40 | — | Ⓐ | ○ | 1 hour |
| Ex. 3 | A-3 | 40 | 0.5 | 1.5 | 40 | — | Ⓐ | ○ | 1 hour |
| Ex. 4 | A-3 | 40 | 0.5 | 1.5 | 40 | used | ○ | ○ | 1 hour |
| Com. Ex. 1 | Lacquer, surfacer*1 was used. | | | | | — | Δ | X (Blister was occurred) | 1 hour |
| Com. Ex. 2 | Urethane surfacer*2 was used. | | | | | Isocyanate was used. | ○ | ○ | 5 hours |

(Notes)
*1: "α-Surfacer" made by ISAMU Paint Kabushiki Kaisha
*2: "Hi-Primersurfacer ZC" made by ISAMU Paint Kabushiki Kaisha Film properties were measured as follows:
(Appearance)

After the composition obtained in each of Examples 1 to 4 and Comparative Examples 1 and 2 is undercoated on a substrate and is dried at 60° C. for 60 minutes. The surface of the undercoat is sanded with a No. 400 water-proof abrasive paper, and a urethane resin paint (commercially available under the trade name "Super White" made by ISAMU Paint Kabushiki Kaisha) is spraied as a top coat. The appearance is observed with the naked eye after drying at 60° C. for 30 minutes.

o: The film is smooth with no wrinkling.

Ⓐ: A little wrinkling is observed.

Δ: Wrinkling is observed.

(Moisture resistance)

A white enamel of a melamine alkyd baking paint (commercially available under the trade name "AMILAC" made by Kansai Paint Kabushiki Kaisha) used for a new car is coated on a substrate and sanded with a No. 400 waterproof abrasive paper. Each of the compositions (primer In addition to the ingredients used in the Examples, other ingredients can be used in the Examples as set forth in the specification to obtain substantially the same results.

What we claim is:

1. An undercoat composition comprising
   (A) a silyl group-containing vinyl polymer whose main chain consists essentially of a vinyl polymer and which has on the polymer chain end or the side chain thereof at least one silicon atom, to which a hydrolyzable group is linked, per polymer molecule,
   (B) a reaction product of an aminosilane compound with an epoxy compound,
   (C) a hydrolyzable ester compound and
   (D) an inorganic pigment.

2. The composition of claim 1, wherein the amounts of said components (B), (C) and (D) are from 0.1 to 300 parts by weight, from 0.1 to 100 parts by weight and from 5 to 1000 parts by weight, respectively, per 100 parts by weight of said component (A).

3. The composition of claim 1, wherein the amounts of said components (B), (C) and (D) are from 0.5 to 50 parts by weight, from 1 to 20 parts by weight and from 30 to 500 parts by weight, respectively, per 100 parts by weight of said component (A).

4. The composition of claim 1, wherein the aminosilane compound is a compound selected from the group consisting of γ-aminopropyltrimethoxysilane, γ-aminopropyltriethoxysilane, N-(β-aminoethyl)-aminopropyltrimethoxysilane and N-(β-aminoethyl)-aminopropyltriethoxysilane.

5. The composition of claim 1, wherein said epoxy compound is a member selected from the group consisting of γ-glycidoxypropyltrimethoxysilane, β-(3,4-epoxycyclohexyl)ethyltrimethoxysilane and an epoxy resin.

6. The composition of claim 1, wherein said hydrolyzable ester compound (C) is an alkyl orthoformate.

7. The composition of claim 1, wherein said hydrolyzable ester compound (C) is a hydrolyzable organic silicon compound selected from the group consisting of methyltrimethoxysilane, ethyltriethoxysilane, tetraethyl orthosilicate, γ-methacryloyloxypropyltrimethoxysilane, vinyltrimethoxysilane and vinyltris(2-methoxyethoxy) silane.

8. The composition of claim 1, which contains not less than 20 parts by weight of a curing agent per 100 parts by weight of said compound (A).

* * * * *

UNITED STATES PATENT AND TRADEMARK OFFICE
CERTIFICATE OF CORRECTION

PATENT NO.: 5,753,737
DATED : May 19, 1998
INVENTOR(S): Matsumura, et al.

It is certified that error appears in the above-identified patent and that said Letters Patent is hereby corrected as shown below:

On the cover page, delete "[30] Foreign Application Priority Date
      June 3, 1986 [JP] Japan... 61-137898"

Signed and Sealed this

Twenty-second Day of June, 1999

Attest:

Attesting Officer

Q. TODD DICKINSON

Acting Commissioner of Patents and Trademarks